US012726771B2

(12) United States Patent
Ohara

(10) Patent No.: US 12,726,771 B2
(45) Date of Patent: Sep. 1, 2026

(54) FABRIC MATERIAL INCLUDING WIRE DAMPER OF LOUDSPEAKER HAVING IMPROVED CENTER HOLE SHAPE BY WAVE CRESTS WITH UNEQUAL WIDTHS AND THE METHOD FOR MANUFACTURING THE SAME

(71) Applicant: Hiroko Ohara, Taoyuan (TW)

(72) Inventor: Hiroko Ohara, Taoyuan (TW)

( * ) Notice: Subject to any disclaimer, the term of this patent is extended or adjusted under 35 U.S.C. 154(b) by 196 days.

(21) Appl. No.: 18/636,382

(22) Filed: Apr. 16, 2024

(65) Prior Publication Data

US 2025/0280242 A1 Sep. 4, 2025

(30) Foreign Application Priority Data

Mar. 4, 2024 (TW) ................................ 113107780

(51) Int. Cl.
*H04R 9/06* (2006.01)
*H04R 9/04* (2006.01)
*H04R 31/00* (2006.01)

(52) U.S. Cl.
CPC ............... *H04R 9/043* (2013.01); *H04R 9/06* (2013.01); *H04R 31/00* (2013.01)

(58) Field of Classification Search
CPC ........... H04R 9/043; H04R 9/06; H04R 31/00
See application file for complete search history.

(56) References Cited

U.S. PATENT DOCUMENTS 11,317,229 B1 * 4/2022 Chen ...................... H04R 31/00
2007/0189576 A1 * 8/2007 Chan ........................ H04R 9/06 381/396
2023/0164505 A1 * 5/2023 Chen ........................ H04R 1/06 29/594

* cited by examiner

*Primary Examiner* — Suhan Ni

(57) ABSTRACT

A method for manufacturing a fabric material including wire damper of loudspeaker having improved center hole shape by wave crests with unequal widths, including: weaving warp and weft yarns into a base material, and disposing wire assemblies on the base material; impregnating the base material in a resin solution; drying the base material; and thermoforming a wire damper on the base material, thereby obtaining a fabric material including wire damper with a center hole being elliptical, and a width between first and second sides is smaller than a width between third and fourth sides of the innermost wave crest of the wave portion. Accordingly, a wire damper having circular center hole can be manufactured, such that the inner side of the center hole can fit the voice coil tightly and maintain it at a correct position in the gap of the magnet core without shaking.

5 Claims, 20 Drawing Sheets

S20

FABRIC MATERIAL INCLUDING WIRE DAMPER OF LOUDSPEAKER HAVING IMPROVED CENTER HOLE SHAPE BY WAVE CRESTS WITH UNEQUAL WIDTHS AND THE METHOD FOR MANUFACTURING THE SAME

CROSS-REFERENCE TO RELATED APPLICATION

This application claims the priority of Taiwanese patent application No. 113107780, filed on Mar. 4, 2024, which is incorporated herewith by reference.

BACKGROUND OF THE INVENTION

1. Field of the Invention

The present invention relates to a fabric material including a wire damper of a loudspeaker and the method for manufacturing the same, in particular to a fabric material including a wire damper of a loudspeaker having an improved center hole shape by wave crests with unequal widths and the method for manufacturing the same.

2. The Prior Arts

In the general moving coil loudspeaker, the principle that the reaction force of a fixed magnetic field causes another magnetic field to move in the opposite direction (i.e., opposite magnetisms attract each other, and like magnetisms repels each other) is used to produce sound. Further, the power alternating current generated by the power amplifier is transmitted to the voice coil through a wire to change the polarity of the magnetic field, such that the voice coil generates a reaction force against the fixed magnetic region generated by the magnetic circuit device. A forward pulse causes an outward motion of the diaphragm relative to the magnet, while a backward pulse causes an inward motion of the diaphragm. When the voice coil pushes the diaphragm to reciprocate, the diaphragm pushes air, and the air pressure changes to form sound waves. The damper is responsible for maintaining the voice coil at a correct position in the gap of the magnet core, ensuring that the voice coil reciprocates along the axis direction when being forced.

The conventional method for manufacturing a wire damper of a loudspeaker comprises the following steps: impregnating a base material in a resin solution; drying the base material to form a solid resin layer on the base material; placing the base material between a pressing surface of a pressing mold and a forming surface of a forming mold; forming a center hole of a main body of a wire damper of a loudspeaker on the base material by thermoforming jointly using a pressing center portion on the pressing surface of the pressing mold and a forming center portion on the forming surface of the forming mold; forming a plurality of wave crests and a plurality of wave troughs of a wave portion of the main body on the base material by thermoforming jointly using a plurality of grooves of a pressing wave portion on the pressing surface of the pressing mold and a plurality of protrusions of a forming wave portion on the forming surface of the forming mold; forming an outer portion of the main body on the base material by thermoforming jointly using a pressing outer portion on the pressing surface of the pressing mold and a forming outer portion on the forming surface of the forming mold, thereby obtaining a fabric material including the wire damper of the loudspeaker; and separating the wire damper of the loudspeaker from the base material.

In general, the pressing center portion and the forming center portion are both circular, all the grooves of the pressing wave portion are circular, and all the protrusions of the forming wave portion are circular. Therefore, the ideal shape of the center hole is circular such that the inner side of the center hole can fit the voice coil tightly, and the wire damper of the loudspeaker can maintain the voice coil at the correct position in the gap of the magnet core, thereby preventing the voice coil from shaking.

However, since both the elongation ability and the elastic resilience of the weft yarns are better than those of the warp yarns, after the wire damper of the loudspeaker is separated from the base material, the circular center hole will shrink to be elliptical, wherein the long axis of the center hole is parallel to the warp yarns, and the short axis of the center hole is parallel to the weft yarns. The inner side of the elliptical center hole cannot completely fit the voice coil tightly, and there will be a gap between the inner side of the elliptical center hole and the voice coil, therefore, the wire damper of the loudspeaker cannot maintain the voice coil at the correct position in the gap of the magnet core, causing the voice coil to shake.

SUMMARY OF THE INVENTION

A main object of the present invention is to provide a fabric material including a wire damper of a loudspeaker having an improved center hole shape by wave crests with unequal widths and the method for manufacturing the same, in which the manufactured fabric material including the wire damper of the loudspeaker is further used to manufacture a wire damper of a loudspeaker having a center hole in a circular shape.

In order to achieve the above object, the present invention provides a method for manufacturing a fabric material including a wire damper of a loudspeaker having an improved center hole shape by wave crests with unequal widths, comprising the following steps: weaving a plurality of warp yarns and a plurality of weft yarns into a base material, and disposing a plurality of wire assemblies on the base material, wherein the warp yarns and the wire assemblies extend straightly and are parallel to each other, the weft yarns extend straightly and are perpendicular to the warp yarns and the wire assemblies, each wire assembly is composed of a plurality of wires, and each wire is a monofilament thread; impregnating the base material in a resin solution; drying the base material to form a solid resin layer on the base material; and placing the base material between a pressing surface of a pressing mold and a forming surface of a forming mold; forming a center hole of a main body of a wire damper of a loudspeaker on the base material by thermoforming jointly using a pressing center portion on the pressing surface of the pressing mold and a forming center portion on the forming surface of the forming mold; forming a plurality of wave crests and a plurality of wave troughs of a wave portion of the main body on the base material by thermoforming jointly using a plurality of grooves of a pressing wave portion on the pressing surface of the pressing mold and a plurality of protrusions of a forming wave portion on the forming surface of the forming mold; and forming an outer portion of the main body on the base material by thermoforming jointly using a pressing outer portion on the pressing surface of the pressing mold and a forming outer portion on the forming surface of the forming mold, thereby obtaining a fabric material including the wire damper of the loudspeaker; wherein, the pressing center portion and the forming center portion are both elliptical such that the center hole is elliptical, a long axis of the pressing center portion, a long axis of the forming center portion and a long axis of the center hole are all parallel to a first direction, a short axis of the pressing center portion, a short axis of the forming center portion and a short axis of the center hole are all parallel to a second direction, the first direction is parallel to the warp yarns, and the second direction is parallel to the weft yarns; wherein two sides of an innermost one of the grooves of the pressing wave portion in the first direction are respectively defined as a first side and a second side and are respectively close to two ends of the long axis of the pressing center portion, two sides of the innermost one of the grooves of the pressing wave portion in the second direction are respectively defined as a third side and a fourth side and are respectively close to two ends of the short axis of the pressing center portion, two sides of an innermost one of the protrusions of the forming wave portion in the first direction are respectively defined as a first side and a second side and are respectively close to two ends of the long axis of the forming center portion, two sides of the innermost one of the protrusions of the forming wave portion in the second direction are respectively defined as a third side and a fourth side and are respectively close to two ends of the short axis of the forming center portion, a width between the first side and the second side of the innermost one of the grooves of the pressing wave portion is equal to a width between the first side and the second side of the innermost one of the protrusions of the forming wave portion, a width between the third side and the fourth side of the innermost one of the grooves of the pressing wave portion is equal to a width between the third side and the fourth side of the innermost one of the protrusions of the forming wave portion, the width between the first side and the second side of the innermost one of the grooves of the pressing wave portion and the width between the first side and the second side of the innermost one of the protrusions of the forming wave portion are smaller than the width between the third side and the fourth side of the innermost one of the grooves of the pressing wave portion and the width between the third side and the fourth side of the innermost one of the protrusions of the forming wave portion; wherein the innermost one of the grooves of the pressing wave portion and the innermost one of the protrusions of the forming wave portion jointly form an innermost one of the wave crests of the wave portion, two sides of an innermost one of the wave crests of the wave portion in the first direction are respectively defined as a first side and a second side and are respectively close to two ends of the long axis of the center hole, two sides of the innermost one of the wave crests of the wave portion in the second direction are respectively defined as a third side and a fourth side and are respectively close to two ends of the short axis of the center hole, such that a width between the first side and the second side of the innermost one of the wave crests of the wave portion is smaller than a width between the third side and the fourth side of the innermost one of the wave crests of the wave portion.

In some embodiments, in the step of weaving the base material, the wires are arranged at intervals from each other.

In some embodiments, in the step of weaving the base material, the wires are blend-twisted such that each wire assembly forms a multifilament thread with a circular cross-section.

In some embodiments, in the step of weaving the base material, the wires are braided with each other such that each wire assembly forms a multifilament thread with a flat cross-section.

In some embodiments, in the step of weaving the base material, the wire assemblies are woven, sewn, adhered or sandwiched into the base material.

In order to achieve the above object, the present invention provides a fabric material including a wire damper of a loudspeaker having an improved center hole shape by wave crests with unequal widths, comprising a base material, a wire damper of a loudspeaker, a plurality of wire assemblies and a solid resin layer. The base material is woven from a plurality of warp yarns and a plurality of weft yarns. The wire damper of a loudspeaker is disposed on the base material, and includes a main body. The main body has a center hole, a wave portion and an outer portion, the center hole is elliptical, a long axis of the center hole is parallel to a first direction, a short axis of the center hole is parallel to a second direction, the first direction is parallel to the warp yarns, and the second direction is parallel to the weft yarns, the wave portion includes a plurality of wave crests and a plurality of wave troughs, two sides of the innermost one of the wave crests of the wave portion in the first direction are respectively defined as a first side and a second side and are respectively close to two ends of the long axis of the center hole, two sides of the innermost one of the wave crests of the wave portion in the second direction are respectively defined as a third side and a fourth side and are respectively close to two ends of the short axis of the center hole, and a width between the first side and the second side of the innermost one of the wave crests of the wave portion is smaller than a width between the third side and the fourth side of the innermost one of the wave crests of the wave portion. The wire assemblies are disposed on the base material and pass through the main body, the warp yarns and the wire assemblies extend straightly and are parallel to each other, the weft yarns extend straightly and are perpendicular to the warp yarns and the wire assemblies, each wire assembly is composed of a plurality of wires, and each wire is a monofilament thread. The solid resin layer covers surfaces of the warp yarns, the weft yarns and the wires.

In some embodiments, the wires are arranged at intervals from each other.

In some embodiments, the wires are blend-twisted such that each wire assembly forms a multifilament thread with a circular cross-section.

In some embodiments, the wires are braided with each other such that each wire assembly forms a multifilament thread with a flat cross-section.

In some embodiments, the wire assemblies are woven, sewn, adhered or sandwiched into the main body.

The effect of the present invention is in that since both the elongation ability and the elastic resilience of the weft yarns are better than those of the warp yarns, when the thermoforming of the fabric material including the wire damper of the loudspeaker is completed, an center hole in an elliptical shape and an innermost wave crest of the wave portion in a non-circular shape are manufactured, therefore, after the wire damper of the loudspeaker is separated from the base material, the innermost wave crest of the wave portion will shrink to be circular such that the center hole shrink to be circular. Accordingly, after the assembly of the loudspeaker is completed, the inner side of the center hole can fit the voice coil tightly, such that the wire damper of the loudspeaker can maintain the voice coil at the correct position in the gap of the magnet core, thereby preventing the voice coil from shaking.

DETAILED DESCRIPTION OF THE PREFERRED EMBODIMENT

Figure 1:
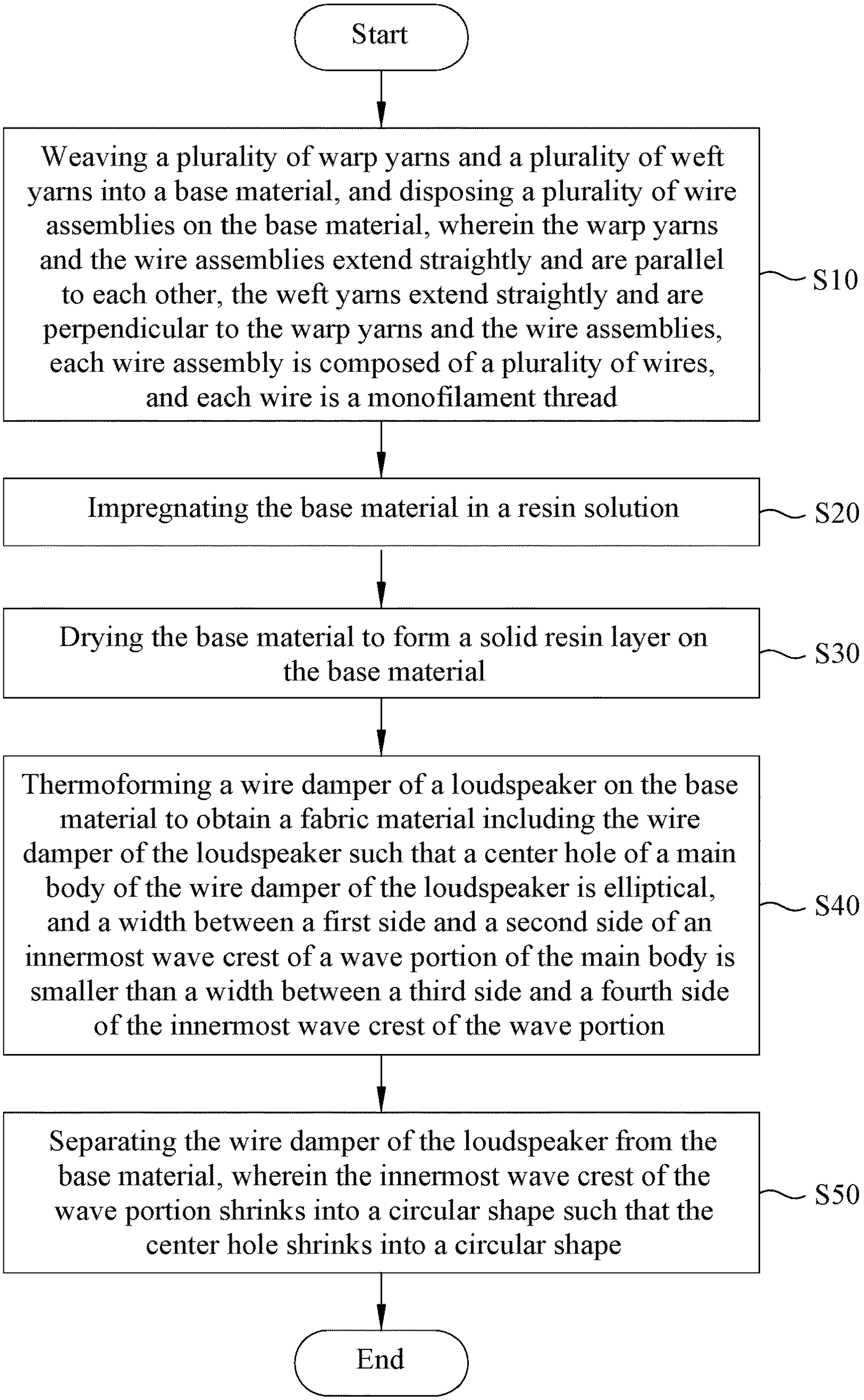
FIG. 1 is a flow diagram of a manufacturing method of the present invention.

Hereinafter, embodiments of the present invention will be described in more detail with reference to the drawings and the reference numerals, such that those skilled in the art can implement it after studying this specification.

Figure 2:
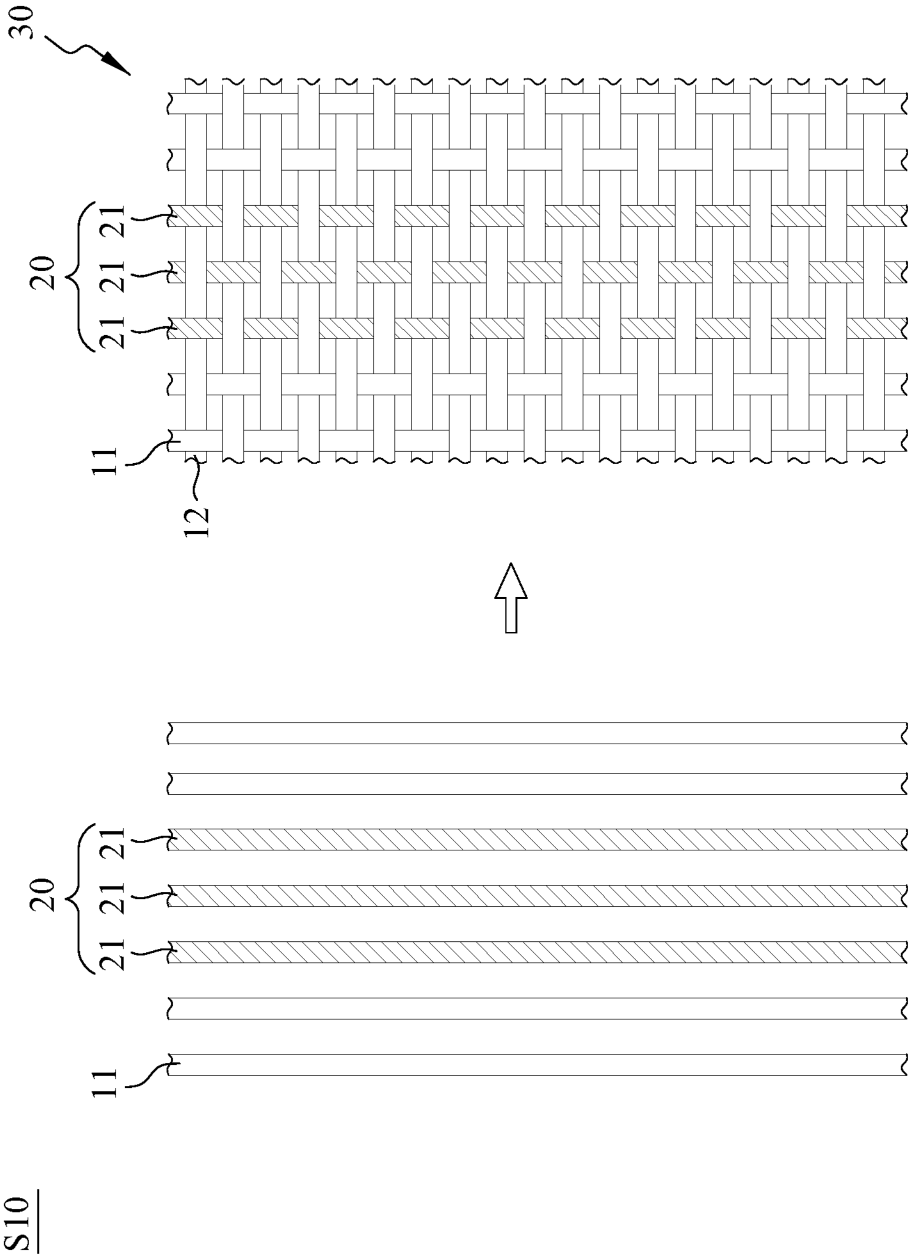
FIG. 2 is a perspective view of a step S10 of the manufacturing method of a first embodiment of the present invention.
Figure 3:
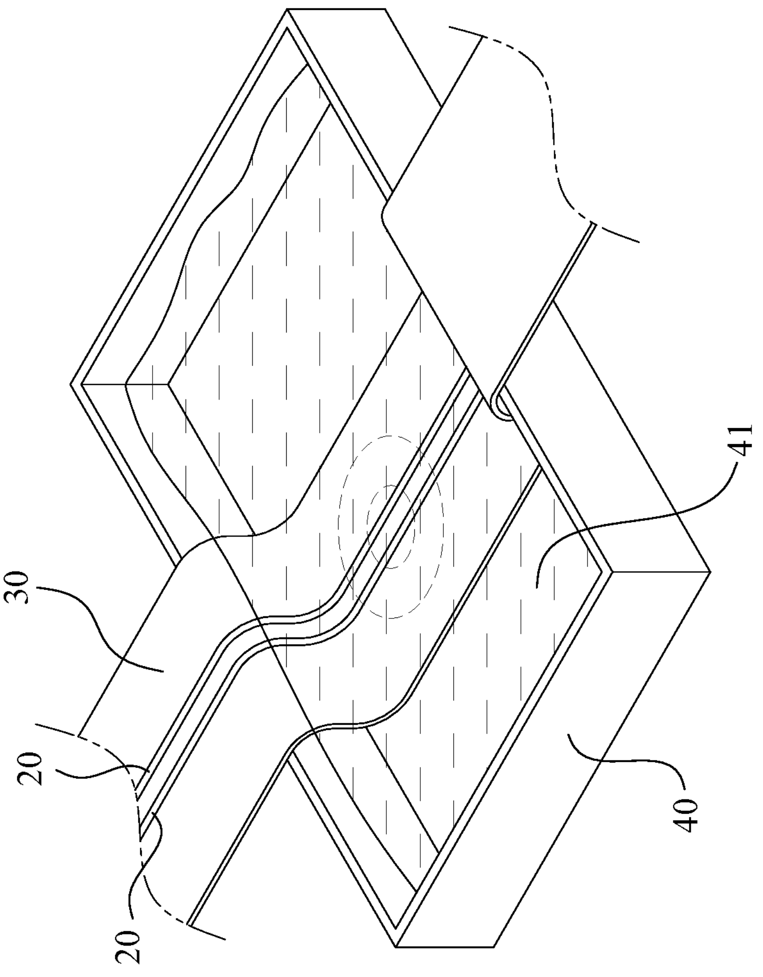
FIG. 3 is a perspective view of a step S20 of the manufacturing method of the present invention.
Figure 4:
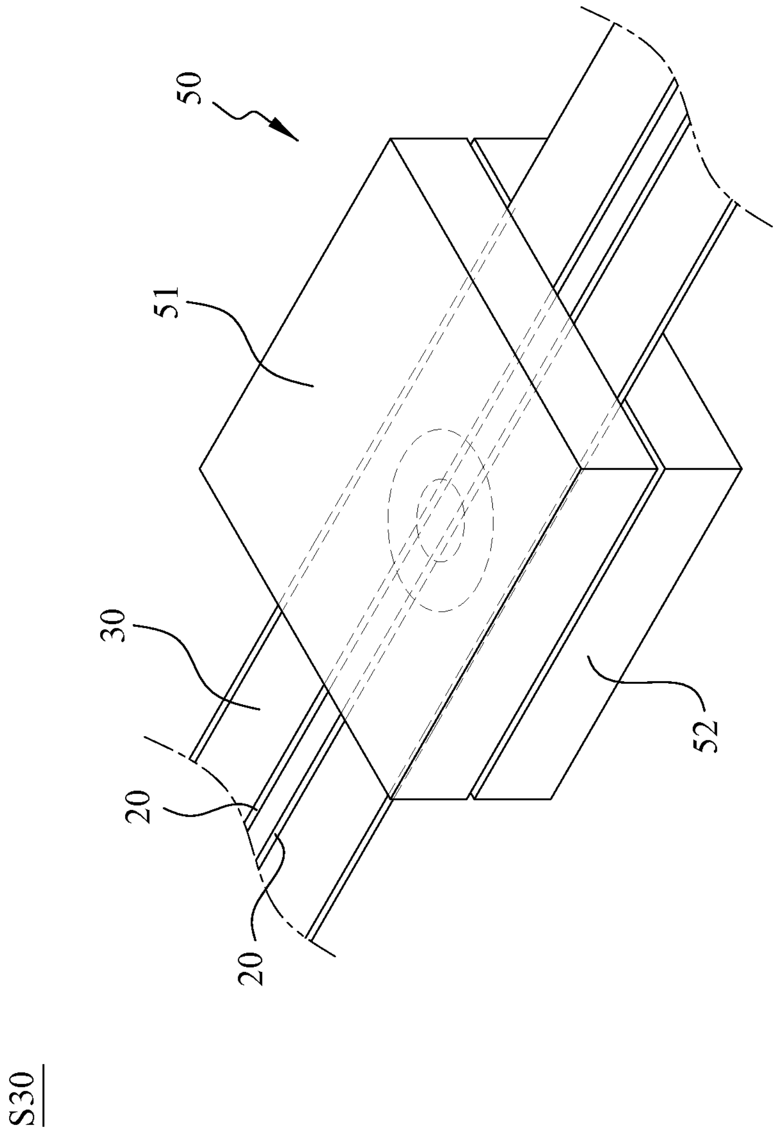
FIG. 4 is a perspective view of a step S30 of the manufacturing method of the present invention.
Figure 5:
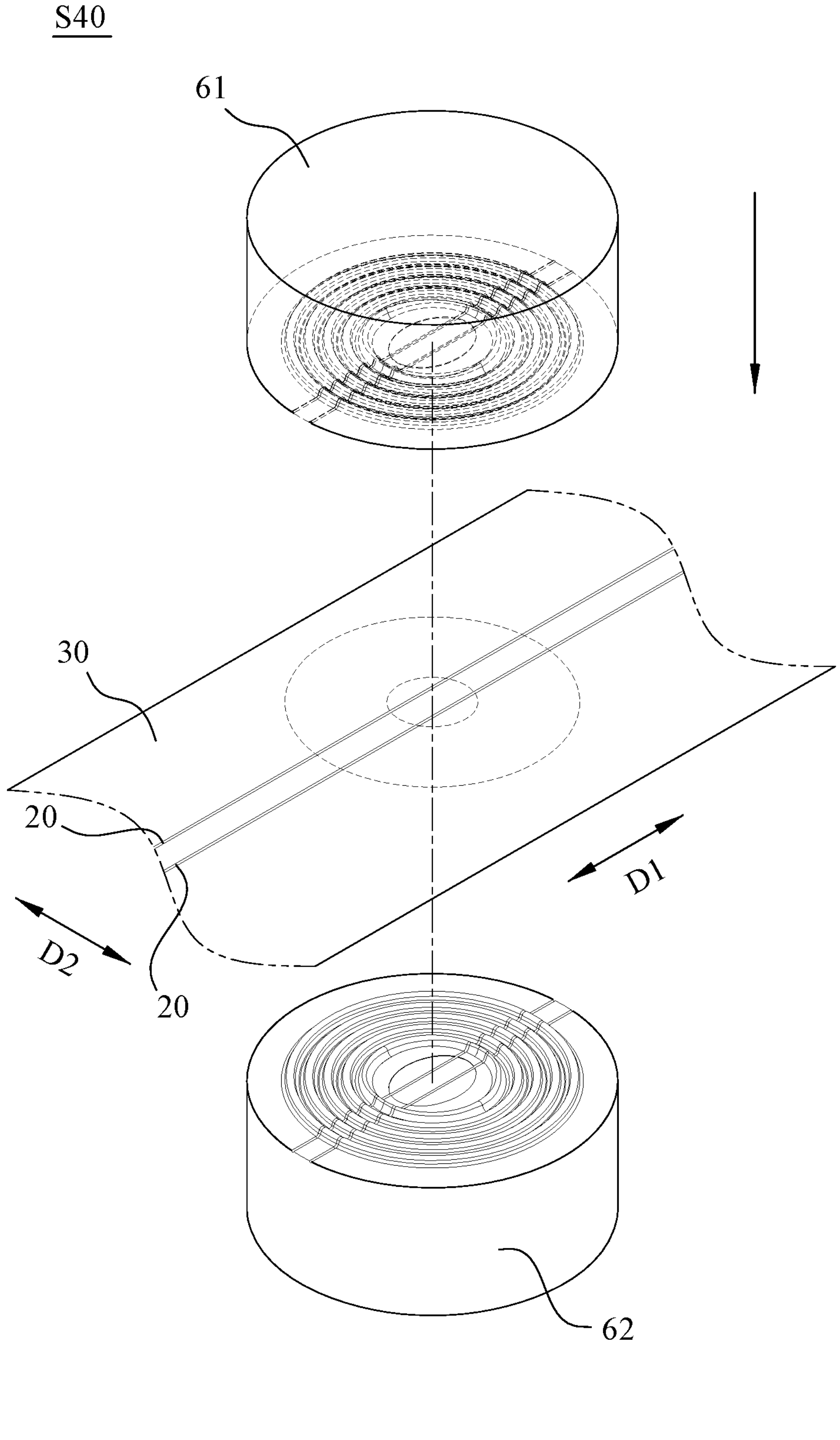
FIG. 5 is a perspective view of a step S40 of the manufacturing method of the present invention.
Figure 6:
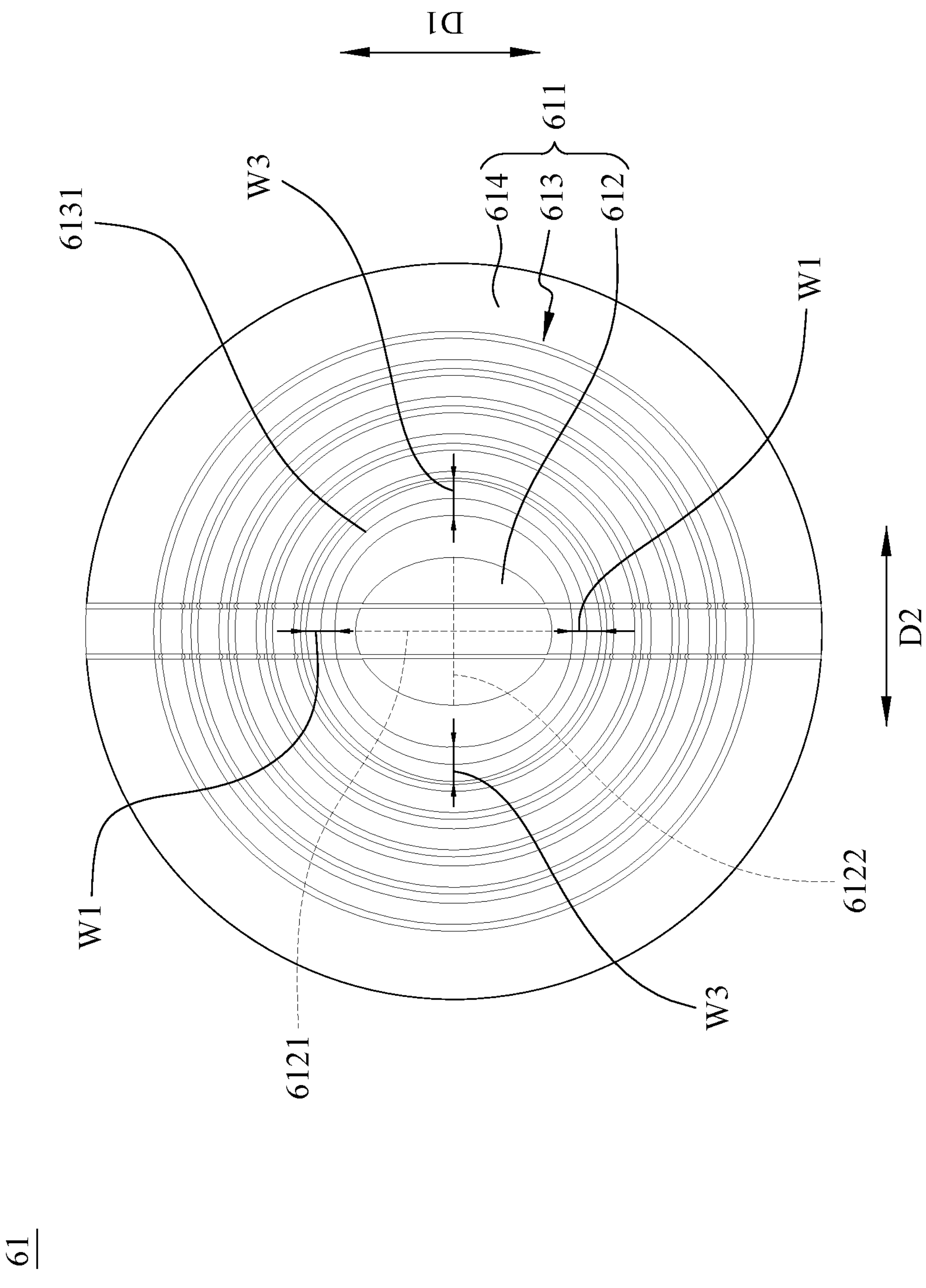
FIG. 6 is a top view of a pressing mold of the present invention.
Figure 7:
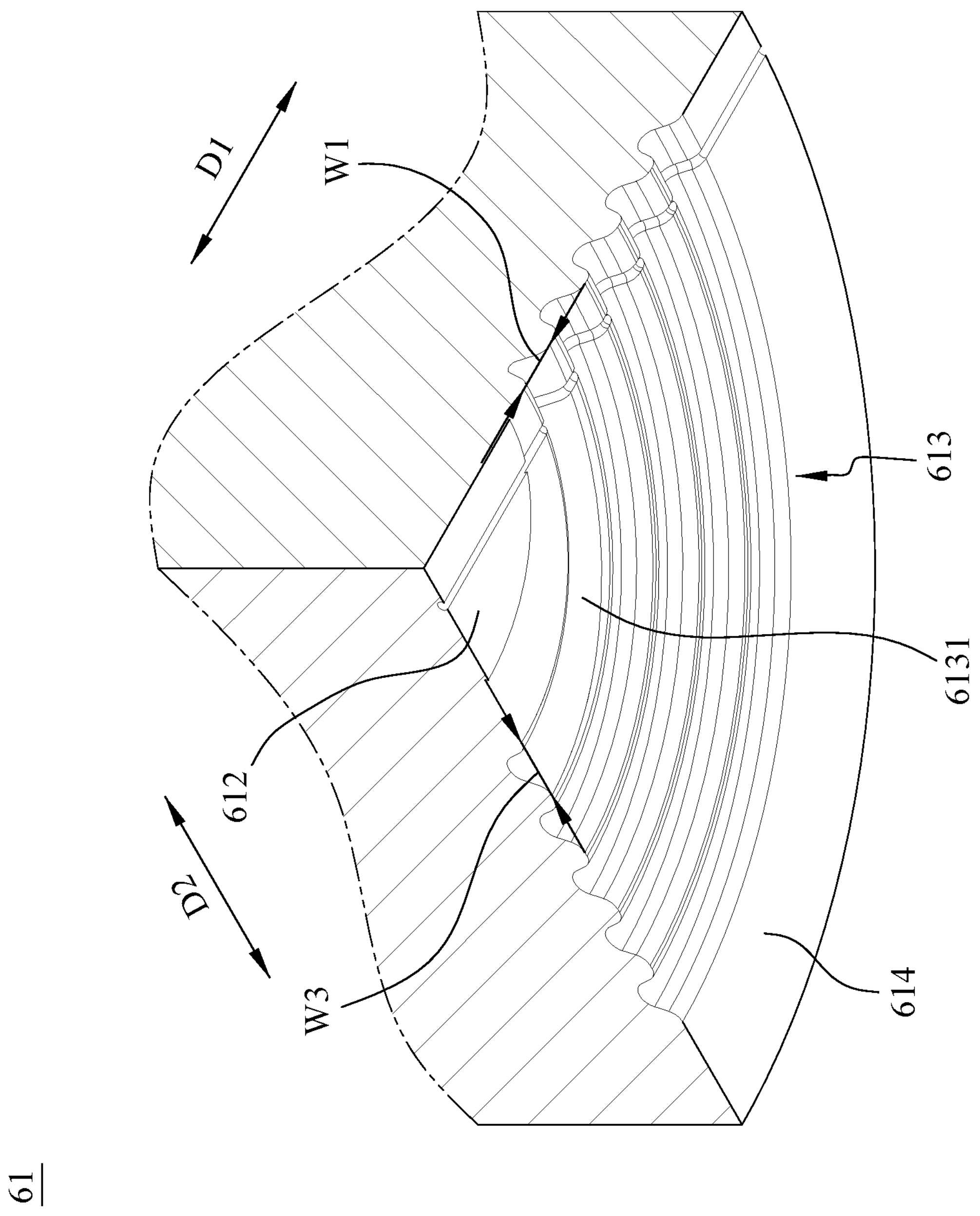
FIG. 7 is a cross-sectional view of the pressing mold of the present invention.
Figure 8:
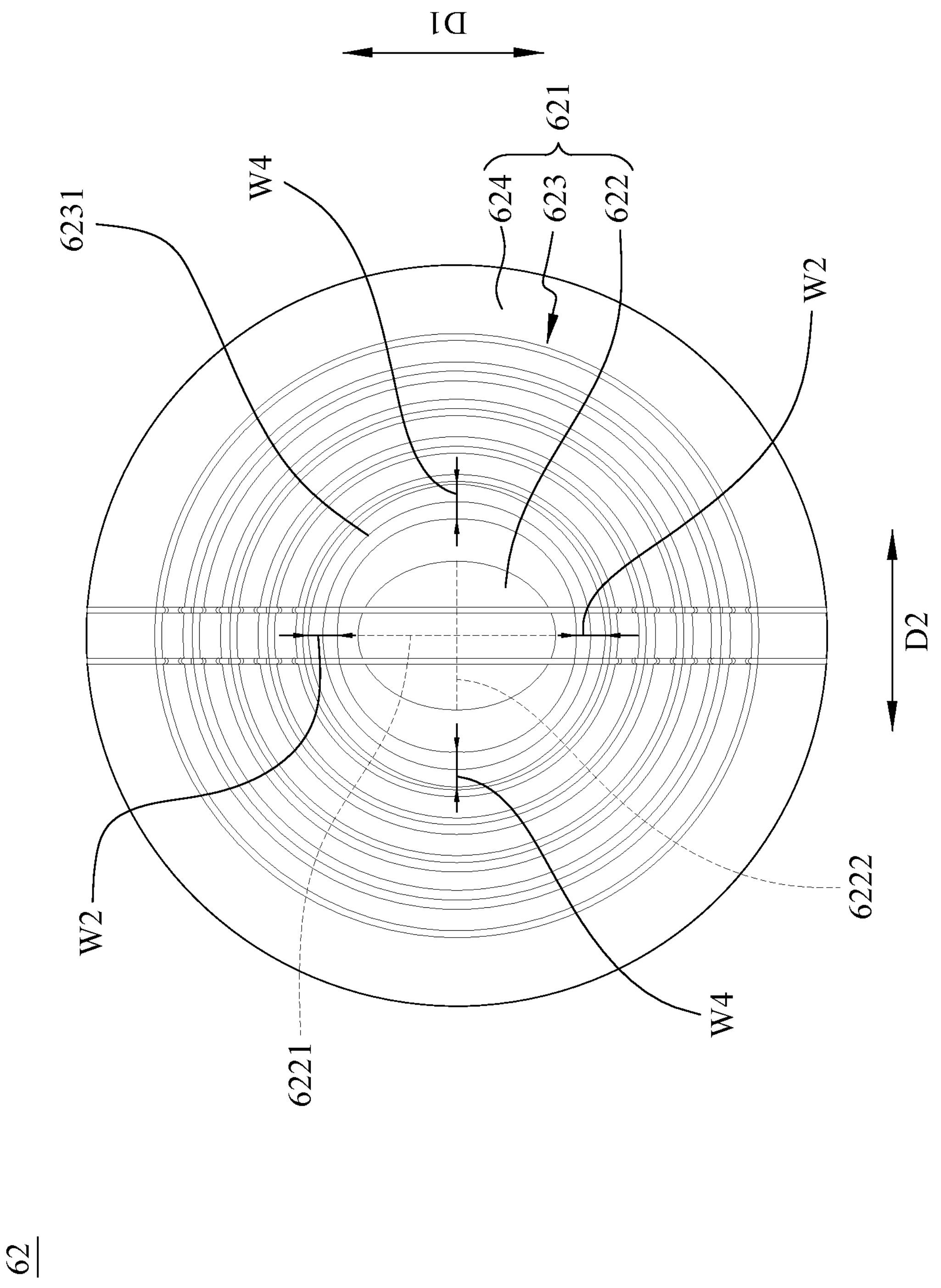
FIG. 8 is a top view of a forming mold of the present invention.
Figure 9:
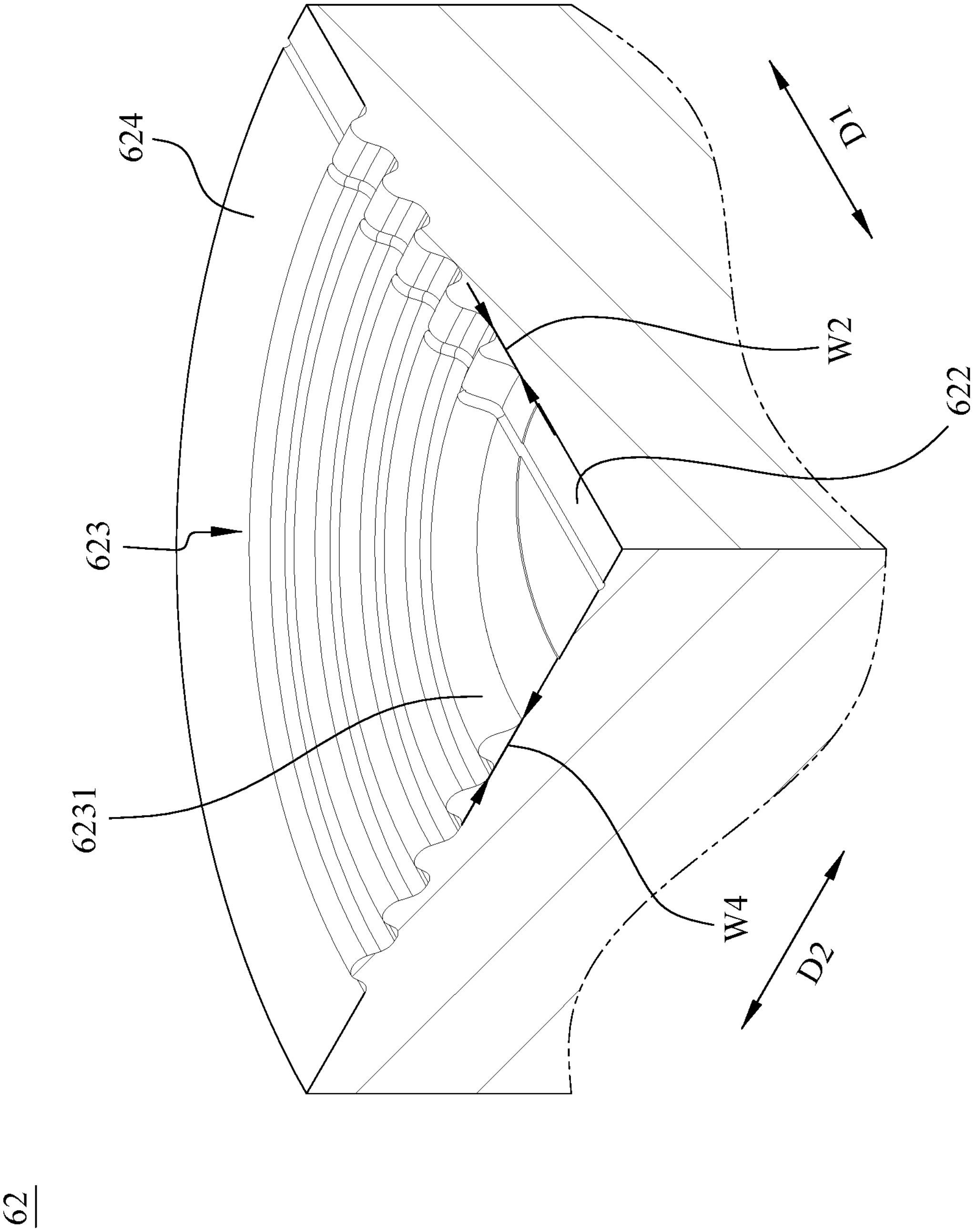
FIG. 9 is a cross-sectional view of the forming mold of the present invention.
Figure 10:
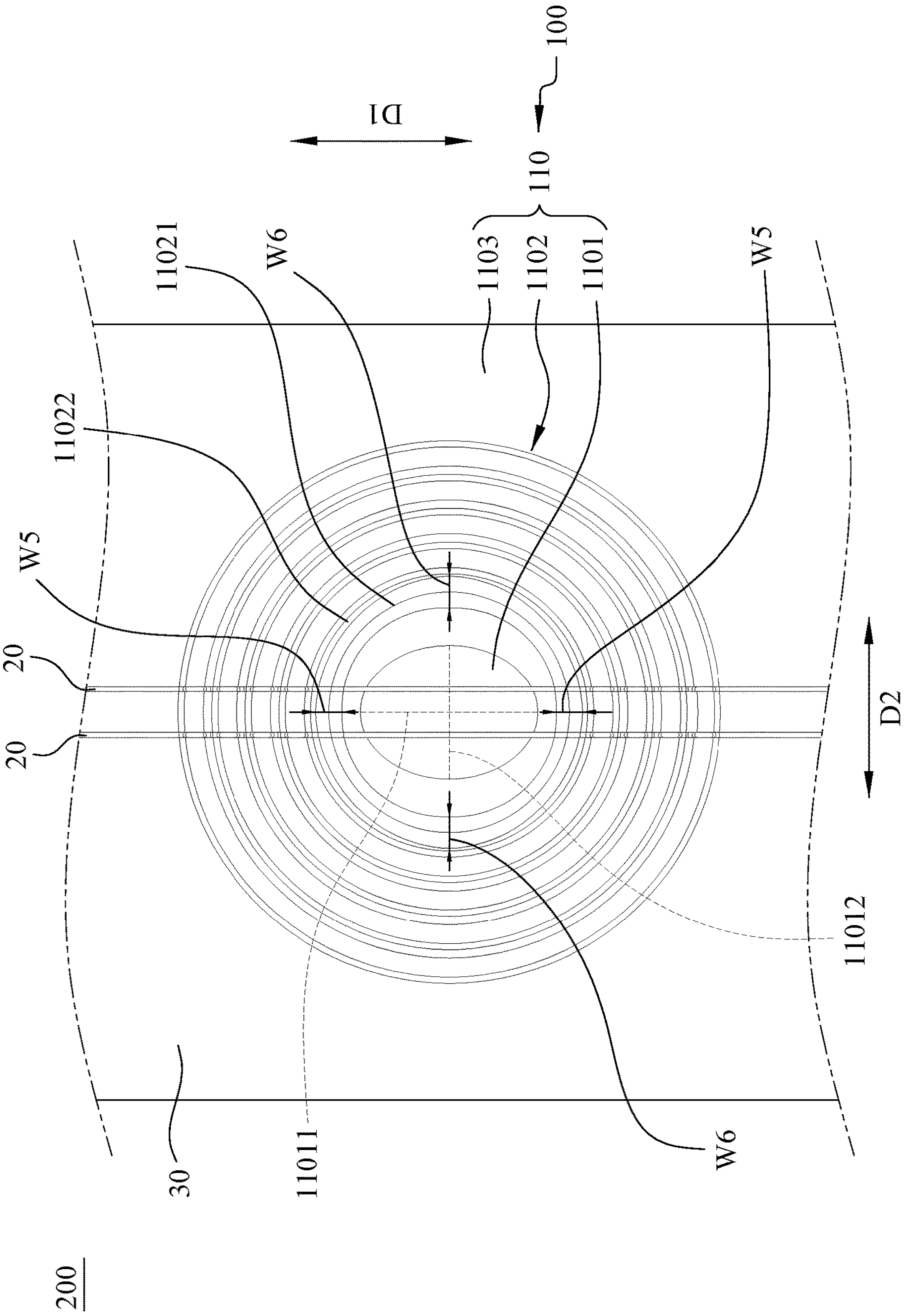
FIG. 10 is a top view of a fabric material including a wire damper of a loudspeaker of the present invention.
Figure 11:
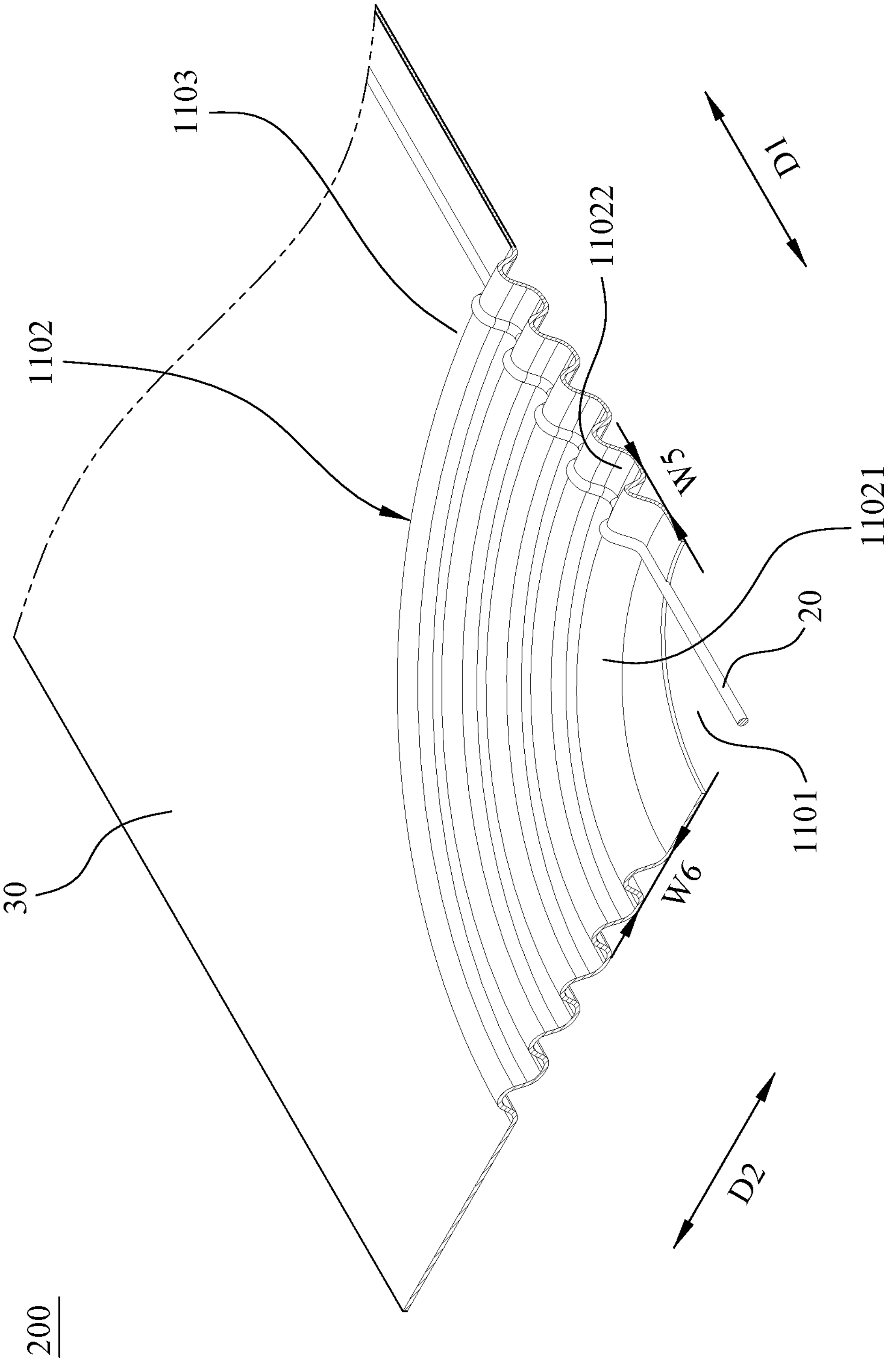
FIG. 11 is a cross-sectional view of the fabric material including the wire damper of the loudspeaker of the present invention.

FIG. 1 is a flow diagram of a manufacturing method of the present invention. FIG. 2 is a perspective view of a step S10 of the manufacturing method of a first embodiment of the present invention. FIG. 3 is a perspective view of a step S20 of the manufacturing method of the present invention. FIG. 4 is a perspective view of a step S30 of the manufacturing method of the present invention. FIG. 5 is a perspective view of a step S40 of the manufacturing method of the present invention. FIG. 6 is a top view of a pressing mold 61 of the present invention. FIG. 7 is a cross-sectional view of the pressing mold 61 of the present invention. FIG. 8 is a top view of a forming mold 62 of the present invention. FIG. 9 is a cross-sectional view of the forming mold 62 of the present invention. FIG. 10 is a top view of a fabric material including wire damper of loudspeaker 200 of the present invention. FIG. 11 is a cross-sectional view of the fabric material including wire damper of loudspeaker 200 of the present invention. The present invention provides a method for manufacturing a fabric material including a wire damper of a loudspeaker having an improved center hole shape by wave crests with unequal widths, comprising the following steps S10~S50:

In the step S10, as shown in FIGS. 1 and 2, a plurality of warp yarns 11 and a plurality of weft yarns 12 are woven into a base material 30, and a plurality of wire assemblies 20 are disposed on the base material 30. The warp yarns 11 and the wire assemblies 20 extend straightly and are parallel to each other. The weft yarns 12 extend straightly and are perpendicular to the warp yarns 11 and the wire assemblies 20. Each wire assembly 20 is composed of a plurality of wires 21, each wire 21 is a monofilament thread, and the wires 21 are arranged at intervals from each other.

In the first embodiment, in the step S10, the warp yarns 11 and the wire assemblies 20 are arranged at intervals; and the weft yarns 12 are interwoven with the warp yarns 11 and the wire assemblies 20 to weave the base material 30. In some embodiments, in the step S10, the wire assemblies 20 are sewn on the base material 30 by a plurality of sewing threads. In some embodiments, in the step S10, the wire assemblies 20 are adhered on the base material 30 by a plurality of adhesive layers. In some embodiments, in the step S10, the wires assemblies 20 are sandwiched between two base materials 30.

In the step S20, as shown in FIGS. 1 and 3, the base material 30 is impregnated in a resin solution 41 in a resin tank 40, such that the warp yarns 11, the weft yarns 12, and the wires 21 adsorb the resin and are adhered with the resin.

Figure 14:
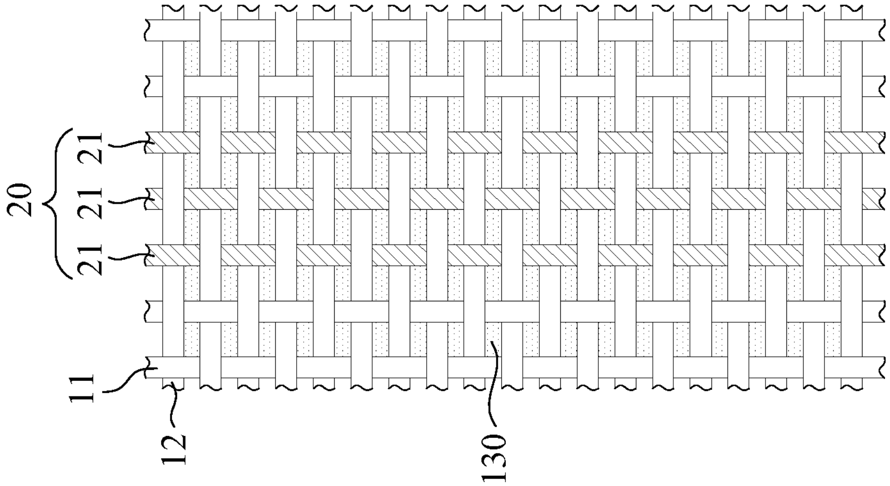
FIG. 14 is a schematic diagram of a region A of FIG. 13.

In the step S30, as shown in FIGS. 1 and 4, a drying device 50, which includes an upper baking plate 51 and a lower baking plate 52, is used, wherein by utilizing the temperature of the upper baking plate 51 and the lower baking plate 52, the moisture and volatile substances in the resin on the base material 30 are removed such that the base material 30 is dried; meanwhile, the resin penetrates into the base material 30 and is adhered onto the warp yarns 11, the weft yarns 12, and the wires 21, so as to form a solid resin layer 130 (referring to FIG. 14), the solid resin layer 130 covers surfaces of the warp yarns 11, the weft yarns 12 and the wires 21 (referring to FIG. 14).

In the step S40, as shown in FIGS. 1 and 5 to 11, the base material 30 is placed between a pressing surface 611 of a pressing mold 61 and a forming surface 621 of a forming mold 62; a pressing center portion 612 on the pressing surface 611 of the pressing mold 61 and a forming center portion 622 on the forming surface 621 of the forming mold 62 are jointly used to form a center hole 1101 of a main body 110 of a wire damper of loudspeaker 100 on the base material 30 by thermoforming; a plurality of grooves 6131 of a pressing wave portion 613 on the pressing surface 611 of the pressing mold 61 and a plurality of protrusions 6231 of a forming wave portion 623 on the forming surface 621 of the forming mold 62 are jointly used to form a plurality of wave crests 11021 and a plurality of wave troughs 11022 of a wave portion 1102 of the main body 110 on the base material 30 by thermoforming; and a pressing outer portion 614 on the pressing surface 611 of the pressing mold 61 and a forming outer portion 624 on the forming surface 621 of the forming mold 62 are jointly used to form an outer portion 1103 of the main body 110 on the base material 30 by thermoforming, thereby obtaining a fabric material including wire damper of loudspeaker 200. The pressing center portion 612 and the forming center portion 622 are both elliptical, such that the center hole 1101 is elliptical. A long axis 6121 of the pressing center portion 612, a long axis 6221 of the forming center portion 622 and a long axis 11011 of the center hole 1101 are all parallel to a first direction D1. A short axis 6122 of the pressing center portion 612, a short axis 6222 of the forming center portion 622 and a short axis 11012 of the center hole 1101 are all parallel to a second direction D2. The first direction D1 is parallel to the warp yarns, and the second direction D2 is parallel to the weft yarns. Two sides of the innermost one of the grooves 6131 of the pressing wave portion 613 in the first direction D1 are respectively defined as a first side and a second side, and are respectively close to two ends of the long axis 6121 of the pressing center portion 612. Two sides of the innermost one of the grooves 6131 of the pressing wave portion 613 in the second direction D2 are respectively defined as a third side and a fourth side, and are respectively close to two ends of the short axis 6122 of the pressing center portion 612. Two sides of the innermost one of the protrusions 6231 of the forming wave portion 623 in the first direction D1 are respectively defined as a first side and a second side, and are respectively close to two ends of the long axis 6221 of the forming center portion 622. Two sides of the innermost one of the protrusions 6231 of the forming wave portion 623 in the second direction D2 are respectively defined as a third side and a fourth side, and are respectively close to two ends of the short axis 6222 of the forming center portion 622. A width W1 between the first side and the second side of the innermost one of the grooves 6131 of the pressing wave portion 613 is equal to a width W2 between the first side and the second side of the innermost one of the protrusions 6231 of the forming wave portion 623. A width W3 between the third side and the fourth side of the innermost one of the grooves 6131 of the pressing wave portion 613 is equal to a width W4 between the third side and the fourth side of the innermost one of the protrusions 6231 of the forming wave portion 623. The width W1 between the first side and the second side of the innermost one of the grooves 6131 of the pressing wave portion 613 and the width W2 between the first side and the second side of the innermost one of the protrusions 6231 of the forming wave portion 623 are smaller than the width W3 between the third side and the fourth side of the innermost one of the grooves 6131 of the pressing wave portion 613 and the width W4 between the third side and the fourth side of the innermost one of the protrusions 6231 of the forming wave portion 623. The innermost one of the grooves 6131 of the pressing wave portion 613 and the innermost one of the protrusions 6231 of the forming wave portion 623 jointly form the innermost one of the wave crests 1102 of the wave portion 1102. Two sides of the innermost one of the wave crests 11021 of the wave portion 1102 in the first direction D1 are respectively defined as a first side and a second side, and are respectively close to two ends of the long axis 11011 of the center hole 1101; two sides of the innermost one of the wave crests 11021 of the wave portion 1102 in the second direction D2 are respectively defined as a third side and a fourth side, and are respectively close to two ends of the short axis 11012 of the center hole 1101; such that a width W5 between the first side and the second side of the innermost one of the wave crests 11021 of the wave portion 1102 is smaller than a width W6 between the third side and the fourth side of the innermost one of the wave crests 11021 of the wave portion 1102.

As shown in FIGS. 10 and 11, the present invention provides a fabric material including wire damper of loudspeaker 200 having an improved center hole shape by wave crests with unequal widths, comprising a base material 30, a wire damper of loudspeaker 100, a plurality of wire assemblies 20 and a solid resin layer 130. The base material 30 is woven from a plurality of warp yarns 11 and a plurality of weft yarns 12 (referring to FIG. 2), and the wire damper of loudspeaker 100 is disposed on the base material 30 and includes a main body 110. The main body 110 has a center hole 1101, a wave portion 1102 and an outer portion 1103. The center hole 1101 is elliptical, a long axis 11011 of the center hole 1101 is parallel to a first direction D1, a short axis 11012 of the center hole 1101 is parallel to a second direction D2, the first direction D1 is parallel to the warp yarns 11, and the second direction D2 is parallel to the weft yarns 12. The wave portion 1102 includes a plurality of wave crests 11021 and a plurality of wave troughs 11022. Two sides of the innermost one of the wave crests 11021 of the wave portion 1102 in the first direction D1 are respectively defined as a first side and a second side, and are respectively close to two ends of the long axis 11011 of the center hole 1101. Two sides of the innermost one of the wave crests 11021 of the wave portion 1102 in the second direction D2 are respectively defined as a third side and a fourth side, and are respectively close to two ends of the short axis 11012 of the center hole 1101. The width W5 between the first side and the second side of the innermost one of the wave crests 11021 of the wave portion 1102 is smaller than the width W6 between the third side and the fourth side of the innermost one of the wave crests 11021 of the wave portion 1102. The wire assemblies 20 are disposed on the base material 30 and pass through the main body 110. The warp yarns 11 and the wire assemblies 20 extend straightly and are parallel to each other. The weft yarns 12 extend straightly and are perpendicular to the warp yarns 11 and the wire assemblies 20. Each wire assembly 20 is composed of a plurality of wires 21, and each wire 21 is a monofilament thread. The solid resin layer 130 covers surfaces of the warp yarns 11, the weft yarns 12 and the wires 21.

Figure 12:
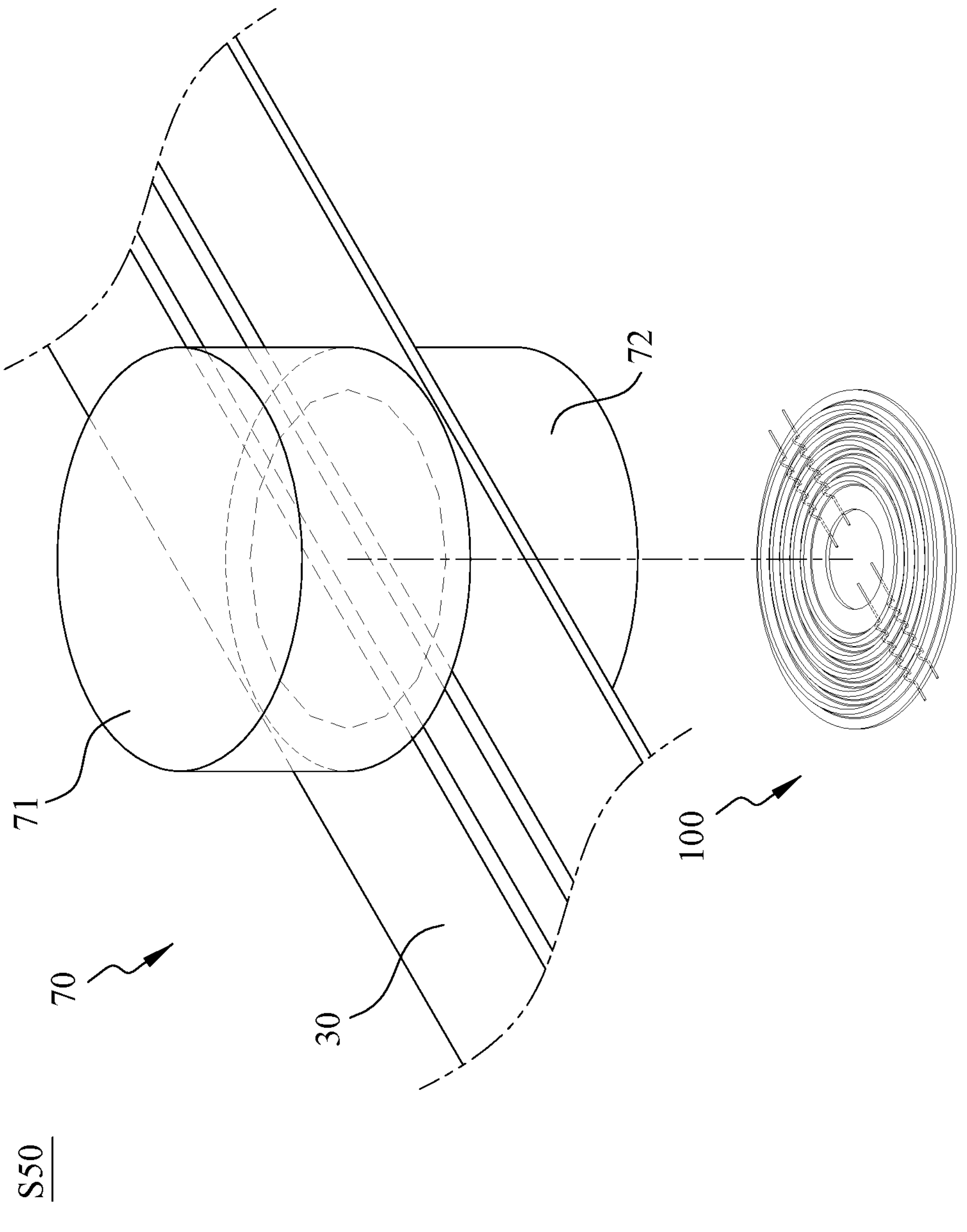
FIG. 12 is a perspective view of a step S50 of the manufacturing method of the present invention.
Figure 13:
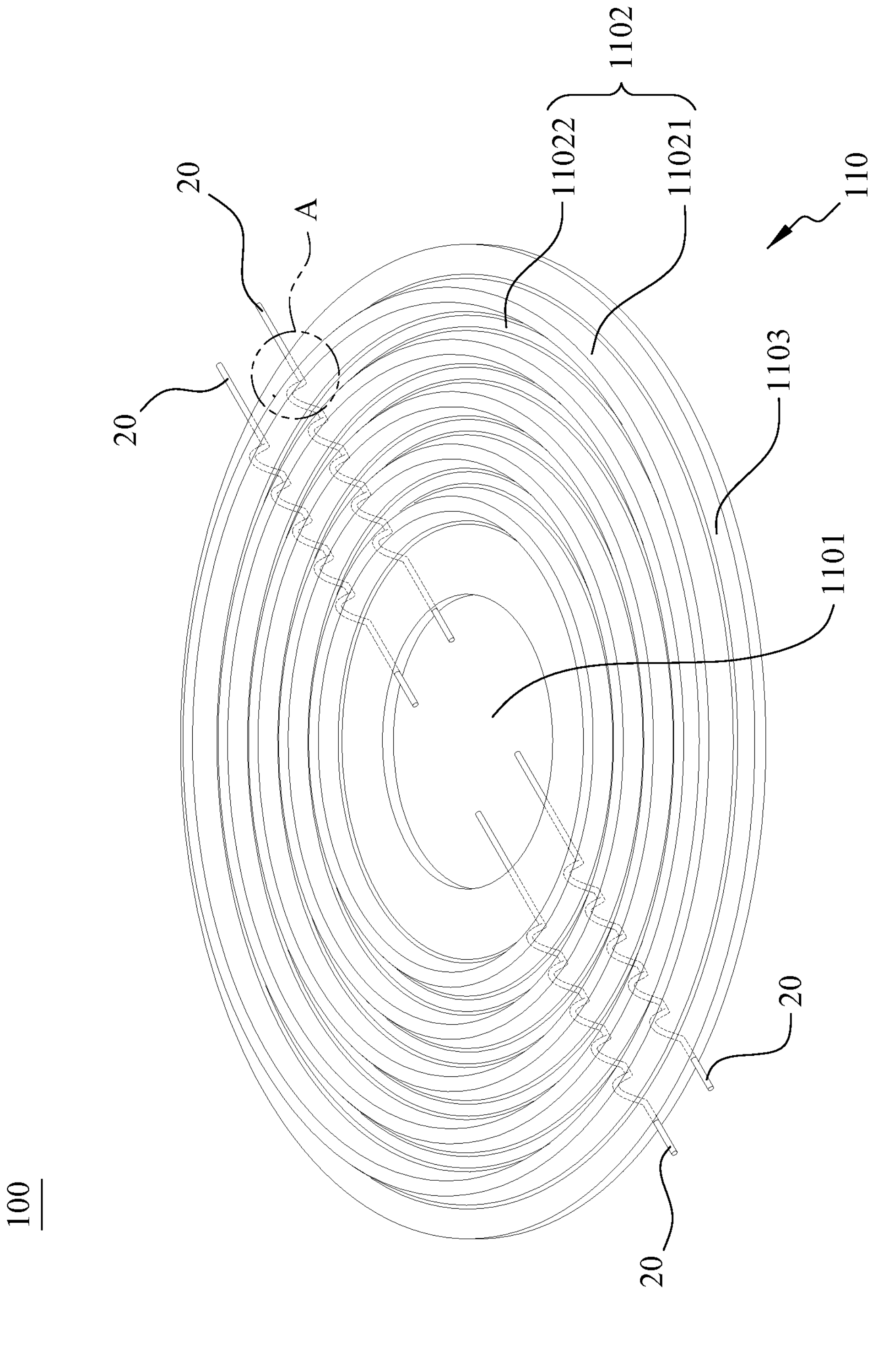
FIG. 13 is a perspective view of the wire damper of the loudspeaker of the first embodiment of the present invention.

FIG. 12 is a perspective view of a step S50 of the manufacturing method of the present invention. FIG. 13 is a perspective view of a wire damper of loudspeaker 100 of the first embodiment of the present invention. FIG. 14 is a schematic diagram of a region A of FIG. 13. After the fabric material including wire damper of loudspeaker 200 is manufactured, the following step is further conducted: a step S50, as shown in FIGS. 1, 12, 13 and 14, wherein a cutting device 70, which includes an upper cutting tool 71 and a lower cutting tool 72, is used, wherein the wire damper of loudspeaker 100 is cut from the base material 30 by the upper cutting tool 71 and the lower cutting tool 72, such that the wire damper of loudspeaker 100 is separated from the base material 30, and the innermost one of the wave crests 11021 of the wave portion 1102 will shrink to be circular such that the center hole 1101 shrink into a circular shape.

Figure 15:
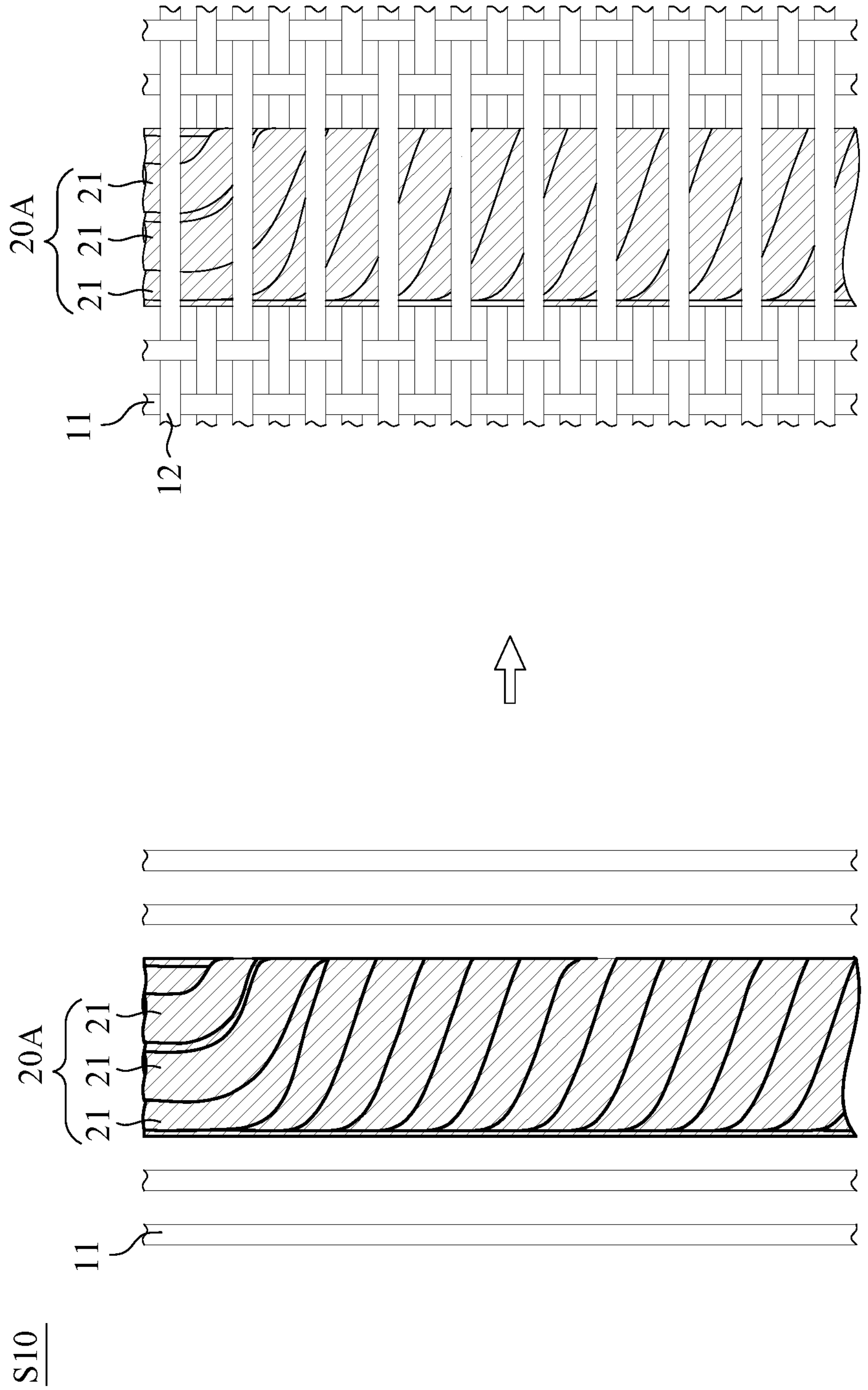
FIG. 15 is a perspective view of a step S10 of a manufacturing method of a second embodiment of the present invention.
Figure 16:
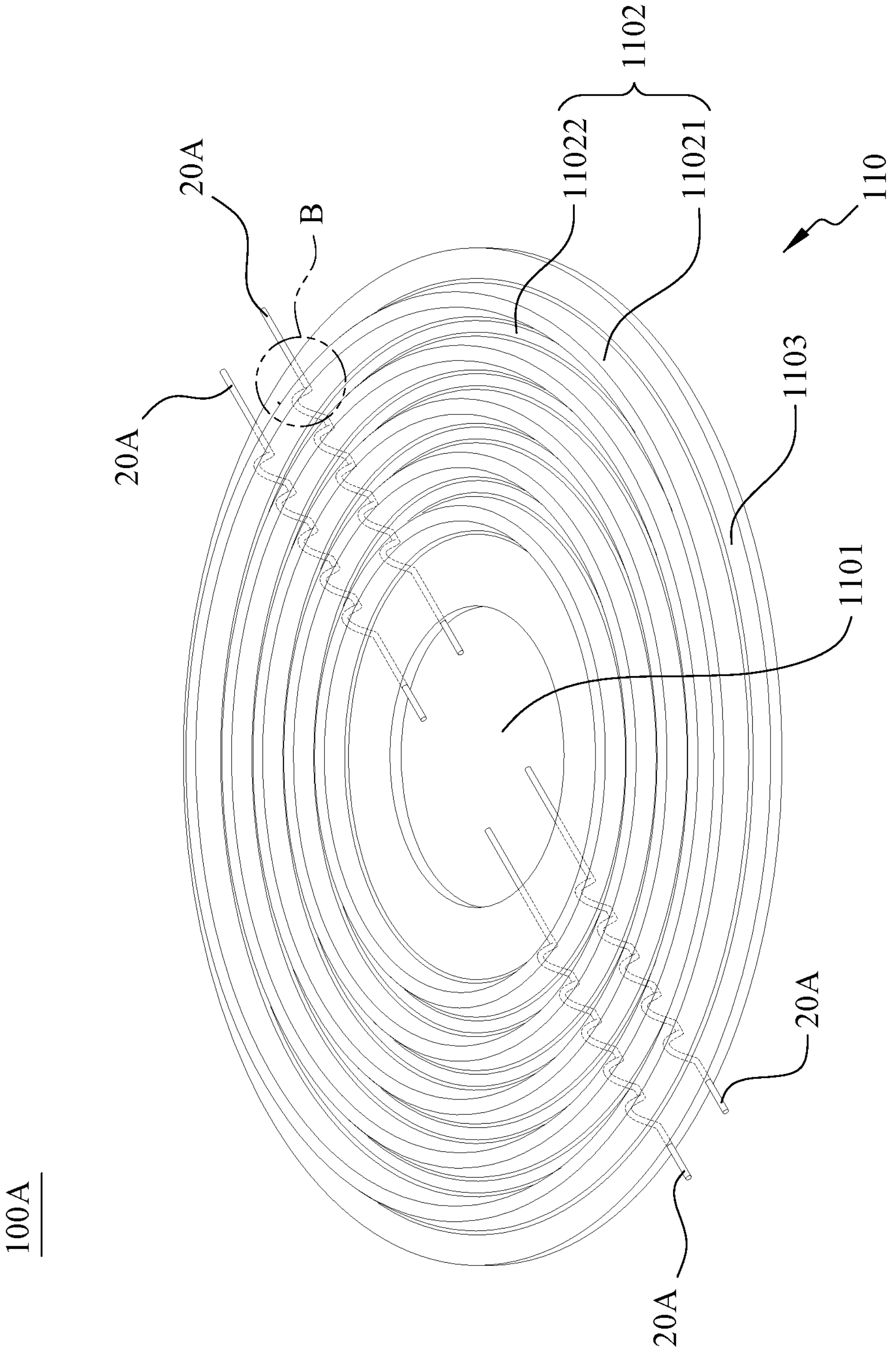
FIG. 16 is a perspective view of a wire damper of a loudspeaker of the second embodiment of the present invention.
Figure 17:
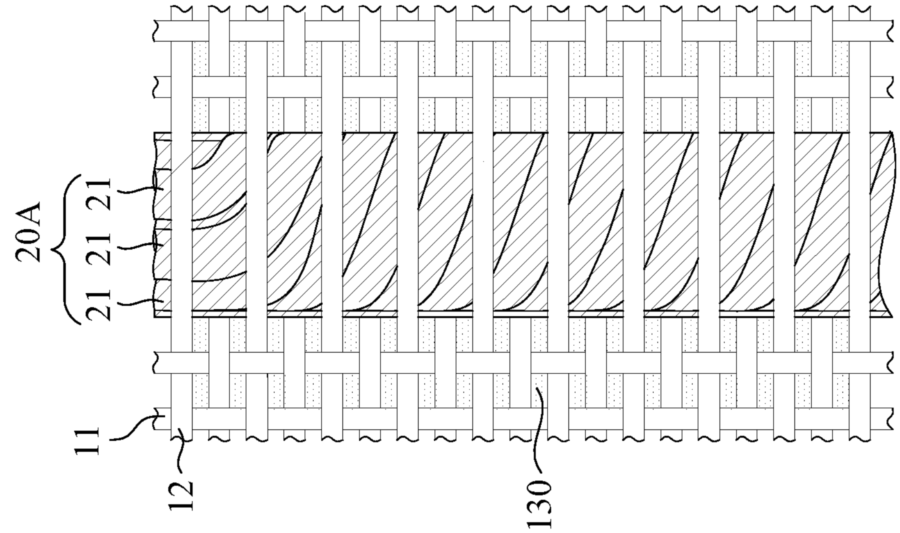
FIG. 17 is a schematic diagram of a region B of FIG. 16.

FIG. 15 is a perspective view of a step S10 of a manufacturing method of a second embodiment of the present invention. FIG. 16 is a perspective view of a wire damper of loudspeaker 100A of the second embodiment of the present invention. FIG. 17 is a schematic diagram of a region B of FIG. 16. As shown in FIGS. 15, 16 and 17, the second embodiment is different from the first previous embodiment in that in the step S10, the wires 21 are blend-twisted, such that each wire assembly 20A forms a multifilament thread with a circular cross-section.

Figure 18:
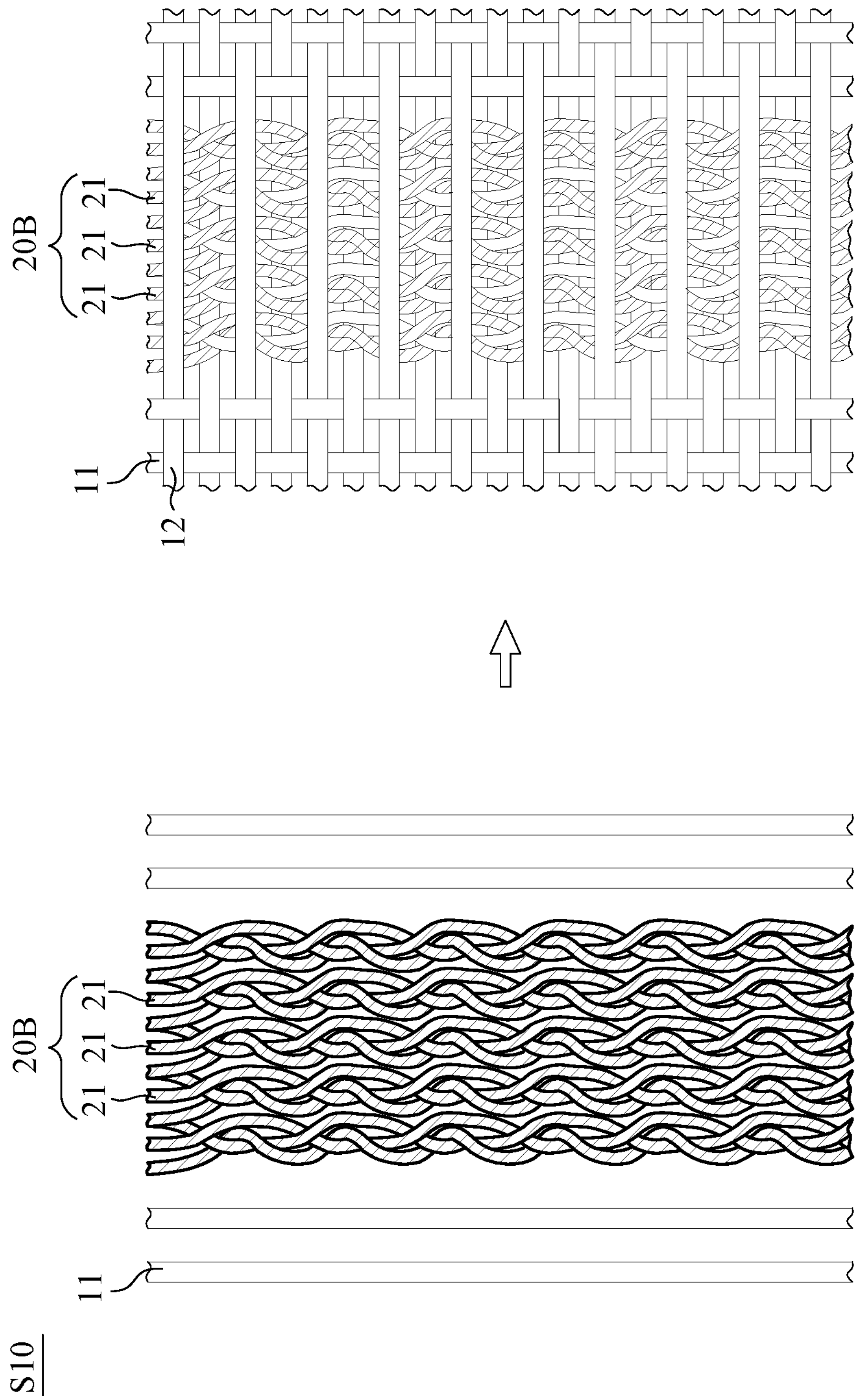
FIG. 18 is a perspective view of a step S10 of a manufacturing method of a third embodiment of the present invention.
Figure 19:
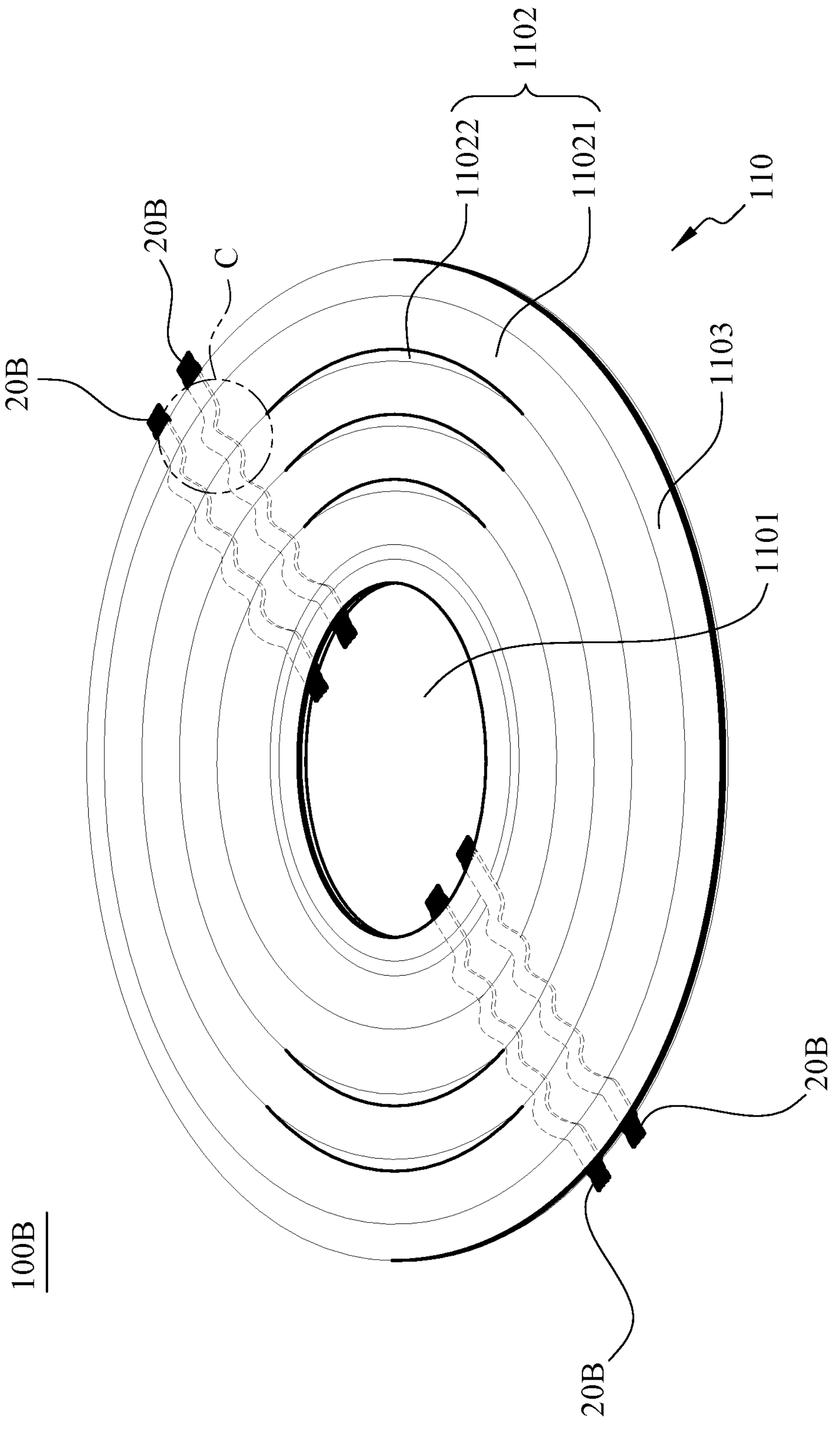
FIG. 19 is a perspective view of a wire damper of a loudspeaker of the third embodiment of the present invention.
Figure 20:
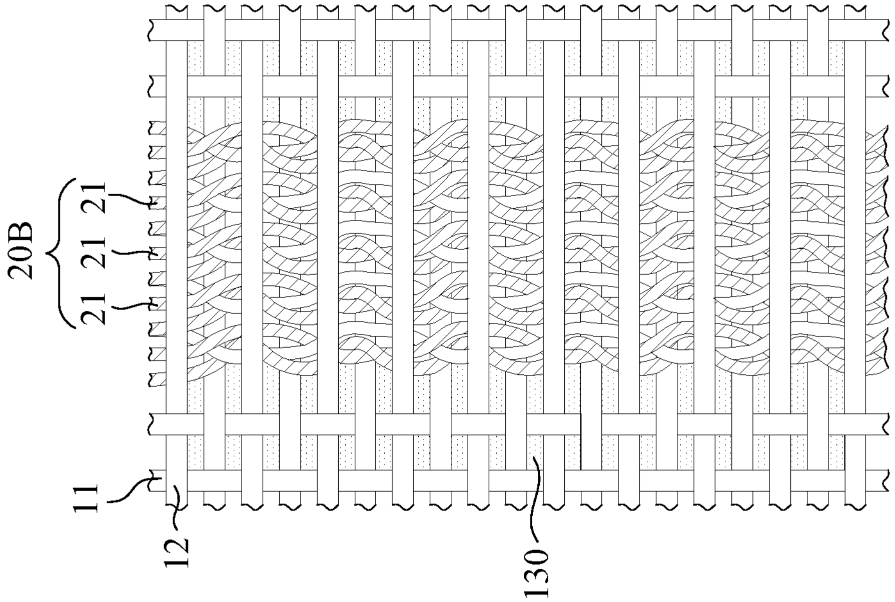
FIG. 20 is a schematic diagram of a region C of FIG. 19.

FIG. 18 is a perspective view of a step S10 of a manufacturing method of a third embodiment of the present invention. FIG. 19 is a perspective view of a wire damper of loudspeaker 100B of the third embodiment of the present invention. FIG. 20 is a schematic diagram of a region C of FIG. 19. As shown in FIGS. 18, 19 and 20, in terms of method, the third embodiment different from the previous embodiments in that in the step S10, the wires 21 are braided with each other, such that each wire assembly 20B forms a multifilament thread with a flat cross-section.

In summary, since both the elongation ability and the elastic resilience of the weft yarns 12 are better than those of the warp yarns 11, when the thermoforming of the fabric material including wire damper of loudspeaker 200 is completed, a center hole 1101 in an elliptical shape and an innermost one of the wave crests 11021 of the wave portion 1102 in a non-circular shape are manufactured, therefore, after the wire damper of loudspeaker 100 is separated from the base material 30, the innermost one of the wave crests 11021 of the wave portion 1102 will shrink to be circular such that the center hole 1101 shrink to be circular. Accordingly, after the assembly of the loudspeaker is completed, the inner side of the center hole 1101 can fit the voice coil tightly, such that the wire dampers of loudspeaker 100, 100A and 100B can maintain the voice coil at the correct position in the gap of the magnet core, thereby preventing the voice coil from shaking.

Those mentioned above are only preferred embodiments for explaining the present invention, but intend to limit the present invention in any forms. Therefore, any modifications or changes related to the present invention made in the same invention spirit should still be included in the scope of the present invention as intended to be claimed.

What is claimed is:

1. A fabric material including a wire damper of a loudspeaker having an improved center hole shape by wave crests with unequal widths, comprising:

a base material, which is woven from a plurality of warp yarns and a plurality of weft yarns;

a wire damper of a loudspeaker, which is disposed on the base material, and includes a main body having a center hole, a wave portion and an outer portion, wherein the center hole is elliptical, a long axis of the center hole is parallel to a first direction, a short axis of the center hole is parallel to a second direction, the first direction is parallel to the warp yarns, the second direction is parallel to the weft yarns, the wave portion includes a plurality of wave crests and a plurality of wave troughs, two sides of an innermost one of the wave crests of the wave portion in the first direction are respectively defined as a first side and a second side and are respectively close to two ends of the long axis of the center hole, two sides of the innermost one of the wave crests of the wave portion in the second direction are respectively defined as a third side and a fourth side and are respectively close to two ends of the short axis of the center hole, and a width between the first side and the second side of the innermost one of the wave crests of the wave portion is smaller than a width between the third side and the fourth side of the innermost one of the wave crests of the wave portion;

a plurality of wire assemblies, which are disposed on the base material and pass through the main body, wherein the warp yarns and the wire assemblies extend straightly and are parallel to each other, the weft yarns extend straightly and are perpendicular to the warp yarns and the wire assemblies, each wire assembly is composed of a plurality of wires, and each wire is a monofilament thread; and a solid resin layer, which covers surfaces of the warp yarns, the weft yarns and the wires.

2. The fabric material including a wire damper of a loudspeaker according to claim 1, wherein the wires are arranged at intervals from each other.

3. The fabric material including a wire damper of a loudspeaker according to claim 1, wherein the wires are blend-twisted such that each wire assembly forms a multifilament thread with a circular cross-section.

4. The fabric material including a wire damper of a loudspeaker according to claim 1, wherein the wires are braided with each other such that each wire assembly forms a multifilament thread with a flat cross-section.

5. The fabric material including a wire damper of a loudspeaker according to claim 1, wherein the wire assemblies are woven, sewn, adhered or sandwiched into the main body.

* * * * *